(12) United States Patent
Jaeger et al.

(10) Patent No.: US 11,762,639 B2
(45) Date of Patent: *Sep. 19, 2023

(54) CONTAINERIZED DEPLOYMENT OF MICROSERVICES BASED ON MONOLITHIC LEGACY APPLICATIONS

(71) Applicant: LZLABS GMBH, Wallisellen (CH)

(72) Inventors: Jan Jaeger, Ruschlikon (CH); Didier Durand, Jougne (FR); Pierre-Jean Ditscheid, Viuz-en-Sallaz (FR); Jean-Luc Vuattoux, Le Lyaud (FR)

(73) Assignee: LZLABS GMBH, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,693

(22) Filed: Aug. 2, 2022

(65) Prior Publication Data

US 2023/0195435 A1     Jun. 22, 2023

Related U.S. Application Data

(63) Continuation of application No. 17/323,810, filed on May 18, 2021, now Pat. No. 11,435,986, which is a continuation of application No. 16/737,552, filed on Jan. 8, 2020, now Pat. No. 11,068,245, which is a continuation of application No. 16/035,328, filed on Jul. 13, 2018, now Pat. No. 10,545,738, which is a continuation of application No. PCT/IB2017/052504, filed on Apr. 28, 2017.

(51) Int. Cl.
*G06F 8/60* (2018.01)
*G06F 8/41* (2018.01)
*G06F 9/50* (2006.01)
*G06F 8/76* (2018.01)
*G06F 8/36* (2018.01)

(52) U.S. Cl.
CPC ............ *G06F 8/427* (2013.01); *G06F 8/4441* (2013.01); *G06F 9/5055* (2013.01); *G06F 8/36* (2013.01); *G06F 8/60* (2013.01); *G06F 8/76* (2013.01); *G06F 9/5077* (2013.01)

(58) Field of Classification Search
CPC . G06F 8/36; G06F 8/427; G06F 8/441; G06F 8/60; G06F 8/76; G06F 9/5055; G06F 9/5077

See application file for complete search history.

(56) References Cited

U.S. PATENT DOCUMENTS

| | | |
|---|---|---|
| 8,458,651 B2 | 6/2013 | Kurian et al. |
| 10,127,030 B1 | 11/2018 | Mortman et al. |
| 2014/0040343 A1 | 2/2014 | Nickolov et al. |
| 2016/0248861 A1 | 8/2016 | Lawson et al. |

(Continued)

OTHER PUBLICATIONS

Vaibhav Rastogi et al., "Towards Least Privilege Containers with CIMPLIFIER," 2016, arXiv, pp. 1-17. Retrieved from the Internet: <URL: https://arxiv.org/pdf/1602.08410.pdf>. (Year: 2016).*

(Continued)

*Primary Examiner* — Hanh Thi-Minh Bui
(74) *Attorney, Agent, or Firm* — Seed IP Law Group LLP

(57) ABSTRACT

The present disclosure provides a scalable container-based system implemented in computer instructions stored in a non-transitory medium. The present disclosure further provides a method of creating and operating a scalable container-based system.

28 Claims, 4 Drawing Sheets

(56) References Cited

U.S. PATENT DOCUMENTS

| | | | |
|---|---|---|---|
| 2017/0046146 A1 | 2/2017 | Jamjoom et al. | |
| 2018/0088935 A1* | 3/2018 | Church | G06F 11/3051 |
| 2018/0097802 A1 | 4/2018 | Lander et al. | |
| 2018/0107586 A1 | 4/2018 | Vyas et al. | |
| 2018/0270125 A1 | 9/2018 | Jain et al. | |

OTHER PUBLICATIONS

Bertrand Noel et al., "Integrating Containers in the CERN Private Cloud" Journal of Physics: Conference Series, vol. 898 (2017), 8 pages.

European Search Report for EP20166635.1 dated Jul. 14, 2020, 6 pages.

Indian Office Action, dated Jul. 2, 2022, for Indian Application No. 201917043630, 7 pages.

Khalloof, Hatem, et al. "A generic distributed microservices and container based framework for metaheuristic optimization." Proceedings of the Genetic and Evolutional:v Computation Conference Companion. 2018.

M. Gschwind, Workload acceleration with the IBM POWER vector-scalar architecture, IBM Journal of Research and Development, Mar. 1, 2016, retrieved online on Mar. 1, 2021, pp. 1-18. Retrieved from the Internet: <URL: https://ieeexplore.ieee.org/stamp/stamp.jsp?tp=&arnumber=7442604>. (Year: 2016).

PCT International Search Report and Written Opinion of International application No. PCT/IB2017/052504, 11 pages, dated Feb. 23, 2018.

Slominski, Aleksander et al. "Building a Multi-tenant Cloud Service from Legacy Code with Docker Containers" 2015 IEEE International Conference on Cloud Engineering, IEEE, pp. 394-396, Mar. 9, 2015.

Weber, Jonas Idiomatic and Reproducible Software Builds using Container for Reliable Computing, arxiv.org, Apr. 18, 2016, retrieved online on Apr. 23, 2022, pp. 1-77. Retrieved from the Internet: <URL: https://arxiv.org/pdf/1702.02999.pdf>. (Year: 2016).

* cited by examiner

CONTAINERIZED DEPLOYMENT OF MICROSERVICES BASED ON MONOLITHIC LEGACY APPLICATIONS

CROSS-REFERENCE TO RELATED APPLICATIONS

The present application is a continuation of U.S. patent application Ser. No. 17/323,810 filed May 18, 2021; which is a continuation of U.S. patent application Ser. No. 16/737,552 filed Jan. 8, 2020, U.S. Pat. No. 11,068,245 issued Jul. 20, 2021; which is a continuation of U.S. patent application Ser. No. 16/035,328 filed Jul. 13, 2018, U.S. Pat. No. 10,545,738 issued Jan. 28, 2020; which is a continuation of PCT International Application No. PCT/M2017/052504 filed Apr. 28, 2017, the contents of which are incorporated in their entirety herein.

TECHNICAL FIELD

The present invention relates to techniques and systems for partitioning monolithic legacy applications for deployment as microservices executing in a containerized, scalable and flexible operating environment.

BACKGROUND

In legacy mainframe computing environments, it is common to find monolithic applications including thousands and even tens of thousands of individual programs all running together in a very monolithic structure in a single operating environment. This monolithic structure of programs may represent substantial investments of time and resources in the development of their underlying code (up to several thousands of man-years), and the interdependent nature of the software programs makes translating or migrating the code from one computer environment very difficult.

Legacy program files may be compiled, assembled and linked with the constraint to run only on a processor of a specific architecture and instruction set, often referred to as part of a legacy system or legacy platform.

FIG. 1A depicts the elements of a legacy platform (100) that uses hypervisor virtualization. The system hardware (10) may include, for example, a mainframe computer running a hypervisor (30), often as a virtual machine monitor (z/VM), to provide as set of fully isolated virtual machines (70), each with its own guest Operating System (OS) (20), and associated OS libraries (80) in which programs are typically run. The hypervisor (30) provides a management platform that partitions the resources of the host machine into the set of virtual or guest machines (70) that can operate independently within the legacy system. A guest operating system (40), or multiple guest operating systems (40) are installed in the virtual machines. A set of binaries and library programs (50), and one or more applications (60) then run on a given virtual machine. Like a physical machine, the virtual machine has associated state information, can be backed up or restored, and may be assigned dedicated system resources. The starting up and tearing down of a virtual machine in a hypervisor system requires considerable overhead, and for this reason, when established, virtual machines typically persist for considerable run times.

FIG. 1B depicts an example of a container management system (110). The hardware (15) of the container system may be a physical server or a cluster of physical servers, which may, for example, be X86-based computers. The host operating system kernel (25) of the system, such as Linux, is shared by the platform, and a set of containers (75) are enabled through a container management system (35) such as Docker. In particular, the namespace and cgroup functionality of the Linux kernel may be used for containerization. Container management systems may be provided as wrappers around the kernel functionalities and allow for container management, such as deployment.

Other container management systems such as the Amazon ACS, Azure Container Service, Cloud Foundry Diego, CoreOS Fleet, Docker Swarm, Google Container Engine, or Mesosphere Marathon container management system, or other container management and orchestration system can be used. The container management system (35) and a set of shared operating system libraries (85) provide a platform in which the set of containers (75) may execute. For example, some low-level operating system libraries 85, such as those used for basic file input/output (I/O) functions, may be shared by all containers through the operating system kernel or container management system rather than resident in individual containers.

As in the case of the virtual machine, a set of binaries and library programs (55), and one or more applications (65) run in a set of containers (75). By way of example, a library that provides web access services, such as http protocol, may only be needed in some applications and not others, and would thus be included in the library programs (55) when required for a specific application service, but omitted from the library programs (55) of a container with only applications that never use a web access service.

Compared to a virtual machine, a container is a relatively lightweight construct, and is not burdened with the overhead of its own full operating system and all of the state information associated with a physical or virtual machine. Consequently, the starting up and tearing down of a container requires little overhead, which makes the deployment and termination of containers an effective technique for application upgrade, dynamic load balancing and resource allocation within a cluster.

In particular, virtual machines have their own operating system, file system, processor(s), network adapters, and associated storage volumes. The fact that they run a guest operating system over a hypervisor makes virtual machines a heavyweight process, with the overhead of running two operating systems (hypervisor+guest operating system) on top of each other, that cannot be easily launched and terminated, to accommodate changing demand for application services. Containers, on the other hand, share core operating system functions through kernel direct access and other physical resources including storage volumes. Storage volumes are typically resident on fixed disk drives, but may also reside in other mass storage including flash drives, tape, or other fixed or removable storage media. Although the behavior of different container may differ based on binary and library programs that are incorporated into the image loaded into those particular containers, the use of shared operating system services significantly reduces the overhead associated with each individual instance of a container. For this reason, containers are lightweight, relative to virtual machines, which makes the instantiation and termination of containers in response to application demands more feasible. Indeed, in the case of, for example, the Kubernetes container management system running Docker, a container can be launched in a fraction of a second. For that reason, large deployments may launch and terminate several thousands of those containers every second.

Container management systems may also include pods. A pod is a deployment unit in a container system that includes one or more containers that are deployed together on the same host or cluster. In some container management systems, such as Kubernetes, containers in a pod share the same network namespace and port space. Additionally, shared volumes of storage that are attached to the pod may be mounted in one or more of the pod's containers.

A standard Linux distribution includes tens (even hundreds) of thousands of individual files, and, depending on the application for which such a system is used, may be combined with thousands of additional system packages that add functionality to the platform. Examples of such packages include the Apache web server, Java virtual machine, PostgreSQL, or other packages to provide database or language support and the like. These packages include program code and metadata describing the packages and dependencies between packages and other libraries. Shared libraries can be used by dynamically linked packages to provide tremendous functionality, but can greatly increase the footprint of the Linux image, and the complexity of system administration. A minimal instance of Linux that incorporates very few packages may occupy only a few megabytes of memory. On the other hand, a large installation with many packages used to support, for example, a large-scale application web-server with advanced database services may occupy hundreds of megabytes of storage, or even more. The administration of Linux-based platforms often includes the use of package manager software to manage the dependencies between packages and libraries and the recurring upgrades of those libraries and packages. A large image serving multiple targets at once is more complex to manage than a simple one.

Microservices are typically small, autonomous services that can collaborate tightly together to provide the functionality of an application. The autonomous nature of microservices enables them to be deployed independently of each other as isolated services, that may communicate with other services through network calls. A set of closely related microservices, or microservices that, in their operation, share access to a common volume, may be deployed within the same pod. A microservice architecture offers important advantages of manageability, availability, scalability, and deployability on clustered systems. However, the monolithic nature of many legacy applications, makes translating such monolithic applications into sets of minimally interdependent microservices a difficult and manually intensive task. Further complicating the problem, legacy monolithic applications written in Cobol and compiled to run on legacy architectures such as MVS or z/OS with their proprietary APIs cannot generally be exported from the legacy architecture and executed onto a Linux or other operating system or cluster, especially when based on x86 servers. due to differences in instruction sets and APIs.

More generally, systems that translate application code from one operating environment to another, whether through emulation, cross-compiling, transcoding, or a hybrid approach can be developed to enable the execution of a compiled legacy program to run on a guest operating system using a different underlying architecture. However, such systems tend themselves to be large programs that do not easily scale, which is particularly problematic in the case of executing applications that perform high transaction volumes. Additionally, emulation or transcoding systems lend themselves to be monolithic applications because, in order to be useful, the emulator or transcoder must be capable of executing an unknown subset of the possible instructions of the legacy environment in the guest environment.

SUMMARY

The present invention provides a scalable container-based system implemented in computer instructions stored in a non-transitory medium. The system includes a source code repository containing the source code of a monolithic legacy application containing a plurality of programs executable in a legacy computing environment to perform a plurality of transactions. The system also includes a source code analyzer operable to parse the source code and to identify, for each transaction in the plurality of transactions a transaction definition vector identifying each program potentially called during the transaction, to create a plurality of transaction definition vectors. The system also includes a transaction state definition repository operable to store the plurality of transaction definition vectors. The system also includes an activity log analyzer operable to create a dynamic definition repository identifying which programs are actually used by the monolithic legacy application in performing in at least a subset of the plurality of transactions. The system also includes a microservice definition optimizer operable to compare the plurality of transaction definition vectors to the dynamic definition repository and remove unused programs from the transaction definition vectors to create a plurality of microservice definition vectors defining a plurality of microservices. The system also includes a microservice image builder operable to, for each microservice definition vector of the plurality of microservice definition vectors, locate for each program identified by the microservice definition vector compiled source code binaries compiled to run in the legacy computing environment to form a plurality of microservice images corresponding to the microservice definition vectors. The system also includes a microservice image repository operable to store the plurality of microservice images. The system also includes a complementary component repository operable to store a set of binary images of emulator elements of a legacy emulator that, together, are less than a complete legacy emulator, said images corresponding to a plurality of functions or sets of functions of said legacy computing environment, and said images executable in a distinct computer environment characterized by an instruction set distinct from the instruction set of the legacy environment. The system also includes a container builder operable to form a container image for each microservice or a set of microservices in the plurality of microservices using the corresponding microservice image or images from the microservice image repository and using image files from the complementary component repository for the emulator elements of the legacy emulator corresponding to functions or sets of functions employed by the microservice or set of microservices when executed, as identified by signatures of calls in the binaries in the microservice or set of microservices, to create a plurality of container images. The system also includes a container image repository operable to store the plurality of container images executable in the distinct computing environment. The system also includes a container management system operable to create at least one container for execution in the distinct computing environment and to run at least one microservice stored in container image repository in the at least one container.

According to further embodiments, all of which may be combined with the above system and with one another and the above system in any combinations, unless clearly mutually exclusive, the invention also provides:

i) the activity log analyzer is operable to create a plurality of dynamic transaction definition vectors that correspond to at least a portion of the plurality of transaction definition vectors, and wherein the microservice definition optimizer compares each dynamic transaction definition vector to each corresponding transaction definition vector to create the plurality of microservice definition vectors;

ii) the activity log analyzer uses legacy activity logs of the monolithic legacy application generated by running the monolithic legacy application in the legacy computing environment;

iii) the activity log analyzer uses an emulator to run the monolithic legacy application to generate log files and to determine which programs are used by the monolithic legacy application during the execution of transactions;

iv) the source code analyzer is operable to use information from the activity log analyzer to identify the transaction definition vectors;

v) the source code analyzer is further operable to create a plurality of translation tables;

vi) the microservice definition optimizer is operable to further optimize the microservice definition vectors;

vii) the microservice definition optimizer is operable to further optimize the microservice definition vectors by creating additional microservice definition vectors containing programs shared by more than one transaction in the plurality of transactions;

viii) further comprising a binary repository operable to store the compiled source code containing binaries compiled to run in the legacy computing environment;

ix) the compiled source code in the binary repository is compiled from the source code in the source code repository into binary files;

x) the legacy computing environment includes a Multiple Virtual Storage (MVS) or z/OS computer system;

xi) the complementary component repository is further operable to store a plurality of images of operating system software packages used by the legacy emulator, and wherein the container builder also places images of any software packages used by a particular element of the legacy emulator in a particular container image containing the particular element of the legacy emulator.

xii) the container builder is further operable to replace the signatures of calls in the binaries in the microservice or set of microservices with instructions for calls operable in the legacy emulator;

xiii) the container management system is operable to create a plurality of containers;

xiv) a set of complementary images are instantiated in a separate container within a common pod;

xv) more than one copies of at least one container image are activated in more than one separate containers;

xvi) the container management system is operable to vary the number of containers in the plurality of containers;

xvii) the container management system is operable to allocate varying resources to separate containers;

xviii) the container management system is operable to use information from the activity log analyzer to determine how the number of copies of at least one container image to place into more than one separate containers, to determine the number of containers in the plurality of containers, and/or to determine resources to allocate to separate containers;

xix) the container management system is operable to use information from use of the scalable container-based system to determine how the number of copies of at least one container image to place into more than one separate containers, to determine the number of containers in the plurality of containers, and/or to determine resources to allocate to separate containers;

xx) the source code analyzer is further operable to create one or more sub-databases or clusters of sub-databases from a database of the monolithic legacy application;

xxi) the container builder is operable to place the one or more sub-databases or clusters of sub-databases in one or more containers; and xxii) when the source code is changed, the container-based system is operable to automatically update at least one microservice image, at least one container image, and at least one container to contain an updated binary based on the source code change.

The present invention further provides a method of creating and operating a scalable container-based system. The method includes parsing a monolithic legacy application executable in a legacy computing environment and partitioning its program files to create a plurality of transaction definition vectors corresponding to a plurality of transactions performable by the monolithic legacy application and identifying, for each transaction, all programs called by that transaction. The method further includes storing the plurality of transaction definition vectors in a transaction state repository. The method further includes for at least a portion of the plurality of transactions, creating a dynamic definition repository by determining which programs are actually used when the transaction is performed by the monolithic legacy application. The method further includes comparing the plurality of transaction definition vectors to the dynamic definition repository and removing programs not used in a transaction from its corresponding transaction definition vector to create a plurality of microservice definition vectors. The method further includes for each microservice definition vector of the plurality of microservice vectors, locating corresponding compiled source code containing binaries compiled to run in the legacy computing environment and creating a microservice image containing the corresponding compiled source code to form a plurality of microservice images. The method further includes storing the plurality of microservice images in a microservice image repository. The method further includes storing, in a complementary component repository, images of a plurality of elements a legacy emulator operable to execute programs in a different computing environment than the legacy computing environment, the elements of the legacy emulator corresponding to a plurality of functions or sets of functions of the monolithic legacy application. The method further includes forming a container image for each microservice or a set of microservices in the plurality of microservices using the corresponding microservice image or images from the microservice image repository and using image files from the complementary component repository for the elements of the legacy emulator corresponding to functions or sets of functions employed by the microservice or set of microservices when executed, as identified by signatures of calls in the binaries in the microservice or set of microservices, to create a plurality of container images. The method further includes storing the container images in a container image repository. The method further includes creating at least one container in the different computing environment using a container management system and storing at least one container image in the container in a form executable in the different computing environment.

The method further includes executing the microservice or set of microservices in the container.

According to further embodiments, all of which may be combined with the above method and with one another and the above method in any combinations, unless clearly mutually exclusive, the invention also provides:

i) creating a plurality of dynamic transaction definition vectors that correspond to at least a portion of the plurality of transaction definition vectors using the activity log analyzer and comparing each dynamic transaction definition vector to each corresponding transaction definition vector to create the plurality of microservice definition vectors using the microservice definition optimizer;

ii) comprising the activity log analyzer using legacy activity logs of the monolithic legacy application generated by running the monolithic legacy application in the legacy computing environment;

iii) comprising the activity log analyzer using an emulator to run the monolithic legacy application to generate log files and to determine which programs are used by the monolithic legacy application during the execution of transactions;

iv) comprising the source code analyzer using information from the activity log analyzer to identify the transaction definition vectors;

v) creating a plurality of translation tables using the source code analyzer;

vi) further optimizing the microservice definition vectors using the microservice definition optimizer;

vii) further optimizing the microservice definition vectors using the microservice definition optimizer by creating additional microservice definition vectors containing programs shared by more than one transaction in the plurality of transactions;

viii) storing the compiled source code containing binaries compiled to run in the legacy computing environment in a binary repository;

ix) compiling the source code in the binary repository from the source code in the source code repository into binary files;

x) the legacy computing environment includes a Multiple Virtual Storage (MVS) or z/OS computer system.

xi) the complementary component repository storing a plurality of images of operating system software packages used by the legacy emulator, and the container builder also placing images of any software packages used by a particular element of the legacy emulator in a particular container image containing the particular element of the legacy emulator.

xii) the container builder replacing the signatures of calls in the binaries in the microservice or set of microservices with instructions for calls operable in the legacy emulator;

xiii) creating a plurality of containers using the container management system;

ix) instantiating a set of complementary images in a separate container within a common pod;

x) activating more than one copies of at least one container image in more than one separate containers;

xi) the container management system varying the number of containers in the plurality of containers;

xii) the container management system allocating varying resources to separate containers;

xiii) the container management system using information from the activity log analyzer to determine how the number of copies of at least one container image to place into more than one separate containers, to determine the number of containers in the plurality of containers, and/or to determine resources to allocate to separate containers.

xiv) the container management system using information from use of the scalable container-based system to determine how the number of copies of at least one container image to place into more than one separate containers, to determine the number of containers in the plurality of containers, and/or to determine resources to allocate to separate containers.

xv) the source code analyzer creating one or more sub-databases or clusters of sub-databases from a database of the monolithic legacy application.

xvi) the container builder placing the one or more sub-databases or clusters of sub-databases in one or more containers.

xvii) when the source code is changed, automatically updating at least one microservice image, at least one container image, and at least one container to contain an updated binary based on the source code change.

BRIEF DESCRIPTION OF THE DRAWINGS

For a more complete understanding of various embodiments of the present invention and its features and advantages, reference is now made to the following description, taken in conjunction with the accompanying drawings, in which.

DETAILED DESCRIPTION

Figure 1A:
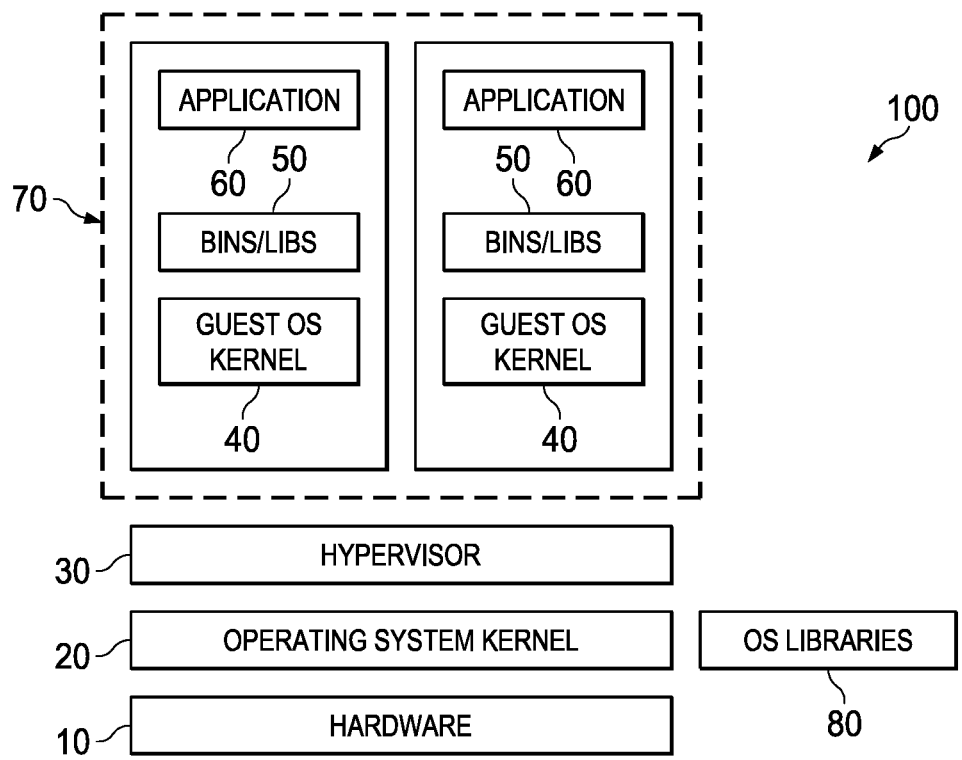
FIG. 1A is a schematic diagram of a prior art hypervisor-based virtual machine environment.

In accordance with one aspect of the invention, a scalable container-based system that can automatically partition a monolithic legacy application into a set of microservices, and deploy such microservices with appropriate elements of a legacy emulator in containers, is proposed.

Processors having different architectures support different instruction sets having different binary representations, with the result that an executable program including machine instructions of one instruction set (often referred to as a "binary" or a "binary image") will not generally execute on a different processor having a different architecture and different corresponding instruction set. Accordingly, a monolithic legacy application designed to run on a legacy processor with a specific architecture using a specific machine instruction set in a legacy computing environment, such as a legacy mainframe computing environment including the legacy processor, is not readily executable on a different type of processor in a different computing environment. In particular, the scalable container-based systems described herein operate using a distinct processor, distinct instruction set, and distinct computing environment than the legacy computing environment in which monolithic legacy applications are designed to run. Thus, a monolithic legacy application would not run in the distinct computing environment of the scalable container-based system without modification of the monolithic legacy application and/or distinct computing environment, such as those described herein.

Typically, in order to run the monolithic legacy application in a distinct computing environment containing a distinct processor, the monolithic legacy application is re-compiled using a compiler designed for the distinct architecture, its instructions are transcoded to run on the distinct architecture, or the monolithic legacy application is run on a legacy architecture translator (hereafter legacy application emulator), which is able to run the executable program as compiled for the legacy computing environment in a distinct computing environment having a distinct architecture. This is only possible when a suitable compiler that can compile the legacy source code to the distinct computing environment exists, or a suitable transcoder or legacy emulator exists.

Accordingly, the scalable container-based system of the present disclosure includes at least one legacy emulator element. However, the scalable container-based system optimizes legacy emulator use by placing emulator elements, such as binary images of functional components, of the legacy emulator in containers only when microservices use those elements, rather than requiring an image of the full legacy emulator in every container to accomplish every task performable by the monolithic legacy application. The separate emulator elements support different subsets of the monolithic legacy application functions.

A legacy emulator typically also uses various functionalities provided by an operating system, such as an input/output functionality. Rather than place an image of the entire operating system in every container, the scalable container-based system also optimizes operating system use by placing OS elements, such as binary images of functional components, of the operating system in container with microservices and emulator elements that effectively use those OS elements. The separate OS elements support different subsets of the legacy emulator functions and related monolithic legacy application functions.

The scalable container-based system may identify individual transactions that may be performed using the monolithic legacy application, such as creating a record, placing order, performing a query, etc. The scalable container-based system then identifies programs included in each individual transaction. Finally, the scalable container-based system creates microservices that may be used or combined to perform the same transaction outside of the monolithic legacy application. In some instances, individual programs that make up a transaction from the monolithic legacy application may be located in a distinct microservices. In other instances, a microservice may contain more than one program from the monolithic legacy application. In addition, because microservices may group programs in any manner to efficiently accomplish transactions from the monolithic legacy application, any one program from the monolithic legacy application may be located in only one microservice of the scalable container-based system, or it may be located in multiple distinct microservices of the scalable container-based system.

A microservice in a single container image may be deployed in multiple parallel instances, typically in separate containers, through a scalable container-based system. A container may include more than one microservice as well as other information as needed to allow the microservice(s) to execute and function. Microservices may preferably be structured so as to be minimally interdependent and/or to minimize the number of microservices requiring changes when programs are updated. The microservice container image may be limited to application binaries and then associated with generic utility (error logging, activity journaling, security, etc.) containers to form a pod.

The scalable container-based system is highly flexible, allowing for changes in the microservices themselves, as well as the type and number of containers, the microservice(s) grouped in a particular container or containers, and supporting programs such as emulator elements and OS elements included in containers and the resources devoted to particular containers or pods based on changes in the transactions, programs, other information, or use of transactions or microservices, among other factors.

In addition, the total number of microservices created from a monolithic legacy application or a portion thereof may be greater than the total number of individual transactions in the monolithic legacy application or the portion thereof.

Figure 3:
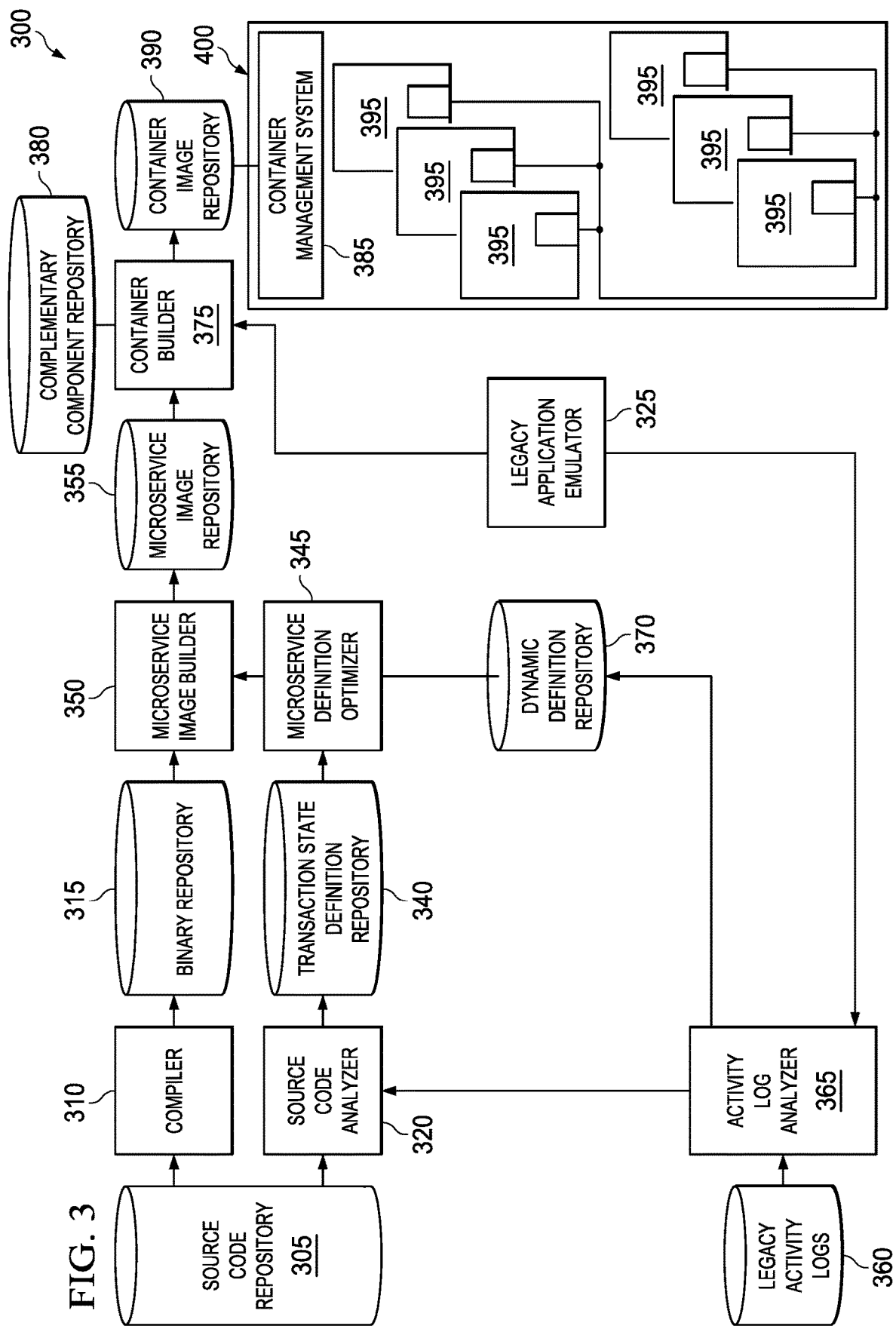
FIG. 3 is a depiction of the components of a scalable container-based system for the partitioning of a monolithic legacy application into microservices.

FIG. 3 illustrates a scalable container-based system (300). The scalable container-based system may include a source code repository (305) that stores the source code of the monolithic legacy application. The source code of the monolithic legacy application may be for example, a monolithic COBOL application that may include dozens, hundreds, or even as many as tens of thousands of individual program files designed to individually or in groups perform hundreds of distinct transactions, $T_1, T_2, \ldots T_x$. Examples of such transactions may include the creation, updating, moving, or deletion of customer records, which may, for example, use the Customer Information Control System ("CICS") or the Information Management System ("IMS") to perform Database 2 ("DB2") relational database transactions or Data Language Interface ("DL/I") hierarchical database transactions. A compiler (310), compiles the source code into a set of one or more binaries that are stored in a binary repository (315).

In accordance with certain embodiments, a source code analyzer (320), typically via a dependency analyzer component, parses the source code and associated files in the monolithic legacy application as stored in the source code repository (305), and generates a code tree that identifies interdependencies (caller callee) in the source code. Preferably, the source code analyzer (320) iterates through each transaction of the monolithic legacy application, as defined in the configuration parameters of the transactional system, such as CICS, IMS, etc. In one example, the source code analyzer (320) receives as input from the source code repository (305), a file identifying the available CICS transaction definitions that may be invoked by the users in their interactions with the monolithic legacy application. Preferably, this file identifies each transaction and its root, or first program invoked when performing the transaction. This may include the root program as the callee of an EXEC CICS LINK, used as in many of the transactions. In this example, the root program refers to the first program called by the program handling the interface (e.g. doing the SEND/RECEIVE MAPs when interface is 3270 but also other equivalent APIs when interface is different). Other files or formats identifying transactions or contributing to their services may be used, for example additional build files may include definitions files for resources used by a transaction, such as message queues and data sources.

Additionally, the source code analyzer (320) may parse all of the program files associated with the monolithic legacy application, to detect interdependency relationships (caller < > callee for programs or inclusion for resources like copybooks) between program files for all of the transactions of the monolithic legacy application. A dependency analyzer within the source code analyzer (320) identifies caller-callee or inclusion relationships between the programs used by a transaction. The static analyzer may generate a call or inclusion tree in the form of a vector or set of vectors or a graph that identifies the programs or modules that the source code for a particular transaction may invoke or include.

Figure 4:
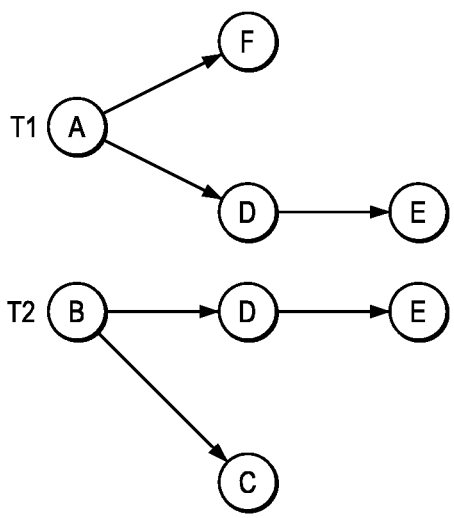
FIG. 4 is a depiction of the components of call trees for two transactions in a monolithic legacy application.

A partitioning of the monolithic legacy application is desired to divide the application into a set of minimally interdependent transactions accessible, for example, via SOAP or REST (with JSON or other data format). Each of the minimally interdependent transactions may be able to run in an independent instance of the legacy emulator (325). An output of the source code analyzer (320) may be a program call or inclusion tree or graph identifying, for each transaction, the complete set of programs that may be invoked or used performing each transaction and the caller-callee or inclusion relationships between the programs. FIG. 4 is an example of such a call tree in which a first transaction, T1, begins with a root program A, which may then call program F or program D. Still in transaction T1, program D may then call program E. A second transaction, T2, begins with root program B, which may then call program C, or also call the same program D, which then calls program E.

Figure 2A:
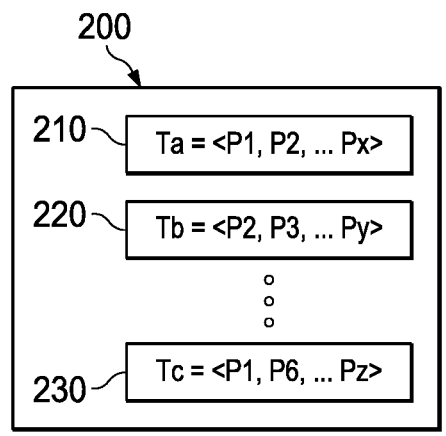
FIG. 2A is a schematic diagram of a set of program vectors corresponding to the transactions of an application.

The call tree may be translated into a set of vectors, one for each transaction or a defined subset of the possible transactions of the monolithic legacy application, identifying the programs that may be invoked in carrying out a transaction. FIG. 2A depicts an example of a set (200) of transaction definition vectors, Ta (210), Tb (220), . . . Tc (230). In this example, a first vector, such as Ta (210), includes the set of programs <P1, P2, . . . Px> that are potentially called in carrying out a first transaction. Using the example of FIG. 4, the transaction might be T1 and this set of programs would include programs A, F, D and E. A second illustrative vector, Tb (220), including programs <P2, P3, . . . Py>, and third illustrative vector Tc (230), including programs <P1, P6, . . . Pz> corresponding to second transaction and third transaction are also shown. Differing numbers and combinations of programs may designate the different transactions of the monolithic legacy application.

The source code analyzer (320) may also, based on the interface definition of the root program, extract or generate the data types, messages, message formats/bindings, and sets of message inputs and outputs, and define addresses and endpoints of each transaction, and translate this information into a message structure for use in constructing and defining an interface to the transactions(s) when the message is provided to the container builder (330) and/or the container management system (335), for example as part of a micro-services image. Additionally, the source code analyzer (320) may also generate a WSDL message interface if the SOAP protocol is used. The WSDL message interface may be a formatted document defined in a W3C standard, including a structure for storing defined data types, messages, port-Types, bindings, ports, and service definition information. The source code analyzer (320) can also generate other representations of the interface messages if other protocols (REST, etc.) and representations (JSON) are preferable for a given situation. The source code analyzer may also be further configured to generate bidirectional data-encoding translation tables or procedures to convert UTF characters to 8-bit EBCDIC characters and vice versa (or between different character sets including ASCII), and this translation may be implemented by generating a script/program to be used with microservices based on the transactions and at their interfaces toward the requester.

The set (200) of transaction definition vectors, the communication interface definition (WSDL, REST), and translation directives through the script may be stored in a transaction state definition repository (340).

The source code analyzer (320) may also include part of a transcoding application to present a transcoder path for the use of transcoded programs into the scalable container-based system. In this way, the source code analyzer may also be used to support transitioning the source code from its original language, such as Cobol, to a different language, such as Java. Other source code translations could be performed. Moreover, the source code analyzer (320) may also be used in the form of a standalone program that is not part of a transcoding application.

Figure 2B:
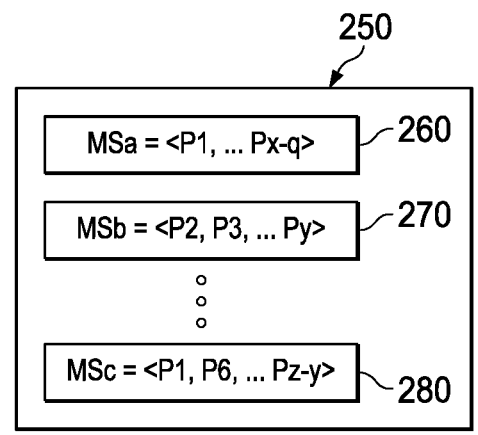
FIG. 2B is a schematic diagram of a set of optimized program vectors corresponding to the transactions of an application.

Each transaction definition vector (210), (220), (230) in the transaction state definition repository (340) includes a superset of the programs that are actually invoked in the course of performing actual transactions using the monolithic legacy application. Frequently, transaction applications contain many programs that are never invoked. This can arise due to the initial design of the transaction application, to design changes, changing use cases, sharing of programs and its callees in different parts of the transaction application or other evolution to the transaction application. The inclusion of these unused programs in the code results in reduced efficiency of the containerized application for a number of reasons, including the overhead required to move around on permanent storage, load and unload into central computer memory programs that are not invoked, as well as additional delays in compiling, building or transporting over a network updates to transaction containers. To eliminate these unused programs from the microservice application images, the microservice definition optimizer (345) extracts the transaction definition vector, interface definition, and translation tables from the transaction state definition repository (340), and applies a dynamic definition vector stored in the dynamic definition repository (350) to eliminate unused programs included in the transaction definition vectors (210), (220), (230) of the transaction state definition repository (340) to arrive at corresponding microservice definition vectors (260) (270), (280), as shown in FIG. 2B, which may be stored in an intermediate state by the microservice definition optimizer (345) pending further refinement and definition of the microservices, or processed by the microservice image builder (350) to create microservice images stored in the microservice image repository (355). In a large monolithic system legacy application, typically there will be unused programs that may be eliminated in this fashion. However, for transactions that use all of the programs identified by the static, transaction state analysis, the microservice definition vector will be the same as the initial transaction definition vector. This is illustrated by transaction definition vector (220) in FIG. 2A and corresponding microservice definition vector (270) in FIG. 2B.

The dynamic definition vector is developed separately from the transaction state definition vectors by a dynamic definition process, which typically runs on a different system or uses legacy activity logs. The dynamic definition vector may previously exist or it may be developed in parallel with the transaction definition vectors.

In the dynamic definition process, the monolithic legacy application is run and each transaction is analyzed to determine which programs are actually called and which are not. When the system is run for a sufficient period of time (e.g. week, month, quarter, year depending on the nature of the application) or using sets of data that invoke all actual use cases, then the dynamic definition vector will more precisely identify the programs that are actually called when performing a transaction.

Alternatively, the dynamic definition vector may also be generated by starting with the static transaction state definition vector, which may be over-inclusive of programs, that then selecting only those programs that are actually invoked. Thus, the dynamic definition vector may be built up as programs are identified, or it may be created by eliminating unneeded programs from the transaction state definition vector.

In some systems, pre-existing legacy activity logs (360) of the monolithic legacy application run in its legacy computing environment are used by activity log analyzer (365) to identify program that are actually invoked by the execution of real-world transactions and thereby generate a program vector indicating which programs are used for each transaction In certain systems, the monolithic legacy application is run on a legacy emulator (325) and an activity log data generated by the emulator is analyzed by an activity log analyzer (365) to generate a program vector indicating which programs are used for each transaction. In some embodiments, the legacy emulator (325) executes each transaction for a period of time sufficient to achieve confidence that all actual variants of use cases for each transaction have been encountered. Alternatively, a defined set of test transactions designed to exercise each actual use case may be carried out, enabling the activity log analyzer (365) to similarly determine which programs are actually used by the transactions in the monolithic legacy application.

In some systems, the activity log analyzer (365) may use information from both legacy activity logs (360) and legacy emulator (325) to determine which programs are actually used by the transactions in the monolithic legacy application. For instance, if legacy activity logs (360) contain no examples of a program being used in a given transaction, logs from the legacy emulator (325) may be consulted or vice versa prior to concluding that the program is not used by that transaction. In another example, transactions for which there is ample legacy data may be evaluated using only legacy activity logs (360), without further emulation by legacy emulator (325). In yet another example, the legacy log data may be used as an initial clue to the definition of microservices.

The output of the activity log analyzer is stored in the dynamic definition repository (370), which stores vectors corresponding to programs actually used, for each transaction.

A load module refers to all or part of an executable program, typically in the context of a mainframe legacy computing environment. Legacy emulator (325) may be an emulator developed to allow the execution of a compiled legacy application or load module from a z/OS or other legacy computing environment to run in a distinct computing environment, such as an x86 platform with the Linux operating system. The legacy emulator may convert each native instruction or native operating system service call of the original executable program into equivalent instructions and systems calls of the distinct computing environment. The legacy emulator (325) may implement a set of native APIs to allow the emulation of individual legacy instructions or system service calls. The legacy emulator (325) may be a single image of the entire emulator, or it may include partitioned images as discussed further herein. The legacy emulator (325) may further include or have operable access to an operating system or components thereof actually used by the legacy emulator.

Microservice definition optimizer (345) applies dynamic transaction vectors stored in the dynamic definition repository (370) to the transaction definition vectors stored in the transaction state definition repository (340) to arrive at microservice definition vectors that may be used by the microservice image builder (350) to create microservice images. These images are then stored in the microservice image repository (355).

FIG. 2B depicts an example of a set (250) of microservice definition vectors, MSa (260), MSb (270), . . . MSc (280). In this example, a first microservice definition vector, Msa (260), includes the optimized vector made from the set of programs <P1b, . . . Px-qb> that are called in carrying out the first transaction Ta. In this example, program P2 is not actually used in transaction Ta and is therefore eliminated from the microservice definition vector. A second illustrative microservice definition vector, MSb (270), includes the programs <P2, P3, . . . Py>. In this example, all programs that make up the transaction definition vector are used and are thus preserved in the microservice definition vector. A third illustrative microservice definition vector MSc (280), includes the programs <P1, P6, . . . Pz-y>. The resulting architecture includes a set of Tx transactions, each defined by the smallest number of programs. Any of the Tx transactions of the monolithic legacy application can be defined as an independently callable microservice, MSx both in the translated operation of the previously monolithic legacy application, and in enhanced or modified applications that may invoke the defined microservices MSx.

Figure 5:
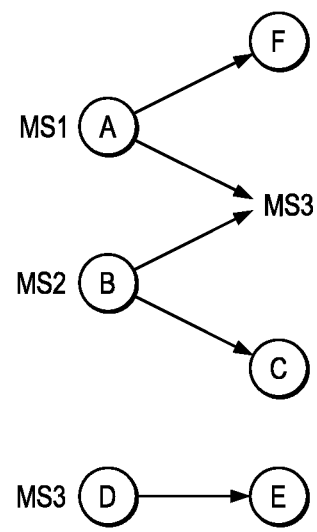
FIG. 5 is a depiction of call trees for the same two transactions of FIG. 4 implemented as microservices in a scalable container-based environment.

Any of the Tx transactions can also be defined as a set of independently callable microservices. For the total set of Tx transactions from a monolithic legacy application, some subset may be defined by one microservice per transaction, while another subset may be defined by a set of microservices per transaction. For example, as illustrated in FIG. 5, if transactions T1 and T2 use common programs D and E, when these transactions are translated into microservices by microservice definition optimizer (345), those common programs may be grouped as an independent microservice, MS3, that may be called by MS1, which contains the other programs of T1, or called by MS2, which contains the other programs of T2.

The microservice definition optimizer (345) may store the microservice image vectors or intermediate microservice image vectors that it then further changes or optimize. For example, the microservice definition optimizer (345), when presented with transaction definition vectors for the transactions of FIG. 4, may first create intermediate microservice definition vectors, MS1 and MS2 both of which contain the programs also located in the transaction definition vectors. The microservice definition optimizer (345), may recognize the common component of these microservice definition vectors MS1 and MS2, as indicated by elements D and E of FIG. 4, and extract the common component from the first two microservice definition vectors. As depicted in FIG. 5, in addition to the first and second microservices, MS1 and MS2, common elements D and E are used to create a third microservice definition vector, MS3, that contains these common components and that may be called by MS1 or MS2. These optimized microservice definition vectors, MS1, MS2 and MS3, are then provided to the microservice image builder (350).

Alternatively, intermediate microservice definition vectors may be stored in a location other than in the microservice definition optimizer (345), such as in an intermediate repository (not shown). In certain embodiments, the intermediate microservice definition vectors may be stored in the microservice image builder (350) or as intermediate images in the microservice image repository (355), then later accessed and/or replaced with optimized microservice definition vectors or microservice images.

Compiler (310), compiles source code in source code repository (305) to produce binaries in binary repository (315). The compiler (310) generates binaries for a legacy computing environment, such as a System 390 or z/OS mainframe. In this way, the binaries used to construct microservice images in the scalable container-based system described herein may be the same as the binaries run in the legacy computing environment, facilitating interoperability and gradual migration of the monolithic legacy application from the legacy computing environment to the scalable container-based system.

The microservice image builder (350) retrieves compiled binaries from the binary repository (315) that correspond to the programs identified in the microservice definition vectors or optimized microservice definition vectors, as applicable and combines the binaries to generate a image for each microservice that includes binary images for each program in the microservice definition vector. The microservice images may also include associated artifacts and information, such as shared resource definitions, etc. retrieved by the microservice image builder (350). These microservice images are stored in the microservice image repository (355).

The container builder (375) constructs container images by combining the binary image(s) associated with a specific microservice stored in the microservice image repository (355) with binary images stored in the complementary component repository (380). The complementary component repository (380) may store a set of image files of emulator elements that together make up a legacy emulator, which is typically the same as the legacy emulator (325) otherwise used by the scalable container-based system.

The legacy emulator may be partitioned by functions or subsets of functions to form legacy elements, which provides advantages for deployment of the legacy emulator in the container-based system described herein. For example, support for subsets of instructions on interfaces supported by the legacy emulator may be separated. In addition, the support in the legacy emulator for batch operations, for CICS transaction services, DB2 or other relational database services, IMS services, security, logging, or other capabilities may be partitioned. In this way, only an individual legacy element or set of elements of the legacy emulator used by microservices in a container may run inside a given container. Additionally, certain legacy elements used by containers in a pod may be stored in separate containers, then accessed by microservices in other containers in the pod. Suitable legacy elements include tracing and logging functions of emulator's runtime environment. Such a set up may improve performance and/or security.

The complementary component repository (380) may also store software packages from the operating system that the legacy emulator may use, which may be referred to as OS elements. For example, individual system API components may also be stored individually as separate images. In some examples, individual packages and library files can be combined at runtime to increase the functionality offered by Linux or another operating system, and the binaries may be stored in the complementary component repository (380).

The container builder (375) can selectively incorporate emulator elements and/or OS elements to provide functionalities associated with a microservice or set of microservices into the container image containing that microservice or set of microservices. In this manner, the overall image size for each container may be smaller than if the full legacy emulator image or a full OS image were included in each container.

The image of a legacy emulator may, in some instances, be several hundred megabytes. The emulator elements that execute a specific function, such as a specific batch process, or a specific database transaction, on the other hand, may only be a few tens of megabytes. Similarly, an image of a full operating system may be many times larger than images of the actual components used by an emulator element.

Accordingly, the partitioning of the legacy emulator into emulator elements and the inclusion of less than all such elements in a container, or in a container in a pod, may reduce the memory used to house the container or the pod by five to seven times as compared to an otherwise identical container or pod containing an image of the full legacy emulator, or emulator elements not used by microservices in the container or pod.

The inclusion of less than all OS elements in a container, or in a container in a pod, may similarly reduce the memory used to house the container or the pod by five to seven times as compared to an otherwise identical container or pod containing an image of the full OS, or OS elements not used by microservices and/or emulator elements in the container or pod.

By including both less than all of the emulator elements and less than of the OS elements in a container, or in a container in a pod, the memory used to house the container or pod may also be reduced by five to seven times as compared to an otherwise identical container or pod containing an image of the full legacy emulator, or emulator elements not used by microservices in the container or pod, and an image of the full OS, or OS elements not used by microservices and/or emulator elements in the container or pod. In this instance, the relative contributions of the reduction of legacy emulator size and operating system size to the reduction of the memory used to house the combination of the two may depend on the relative overall sizes of the legacy emulator and the operating system and the degree of partitioning of both. For instance, in the case of a 200 MB legacy emulator partitioned into around ten elements and a 50 MB operating system partitioned into around fifty elements, the contributions of removing emulator elements will typically outweigh the contributions of removing operating system elements.

The legacy emulator may be partitioned into emulator elements that correspond with the likely needs of microservices. For example, certain functionalities, such as management console and user interface functionalities are likely not needed by microservices or they can be provided natively by the container management system in a form more suitable to this architecture (385) and thus may be separated from the other emulator elements and may even be omitted from the complementary component repository (380). Other emulator elements, such as security elements, may be partitioned specifically so they can be placed in separate containers from other emulator elements and microservices or even replaced by similar services provided by the new system.

The legacy emulator may also be partitioned to place core functionalities, relied on by other components of the legacy emulator, into a core emulator element. Such an element may be included in most, if not all containers, or pods. Often this core emulator element will be a larger proportion of the total legacy emulator size than other emulator elements. For instance, a core emulator element may be between 30% and 40% of the size of the total legacy emulator.

The legacy emulator may further be partitioned to place functionalities likely to be generally used in one or a few containers in a pod, but not all containers, such as security functionalities, in a separate element, such as a security emulator element.

Using a transactional emulator as an example, suitable emulator elements may also include an online/communications emulator element (such as one containing subproducts for CICS and IMS-TM for transactional services), a relational emulator element (such as one for DB2), a hierarchical database emulator element (such as one for IMS-DB), a datasets/date management emulator element (such as one for VSAM files and sequential files), a batch services emulator element, a and/or a languages emulator element (such as one with subproducts for Cobol and PL/1), a security emulator element, and a user interface/management console emulator element.

Subproducts may be excludable from the emulator element image actually incorporated into a container. For instance an online/communications emulator element may contain only binary images for CICS and not for IMS-TM.

Emulator elements may vary in size as compared to the total legacy emulator, but typically, non-core emulator elements may each be between 1% and 20%, more particularly between 3% and 15% of the total legacy emulator size. The size of an emulator element as compared to the total legacy emulator, along with other factors such as likelihood of use together, may be used in determining which functionalities are separated into different emulator elements.

OS elements may be in the form of available packages, such as various Linux packages like PostgresSQL, LLVM, node.js, etc.

The size of OS elements accompanying emulator elements may also be used in determining which legacy emulator functionalities are separated into different emulator elements.

In some scalable container-based systems, the container builder (375) includes a load module compiler, that receives as input, the binaries, such as System 390 or z/OS executable image files, stored in the microservice image repository (355). The load module compiler detects all signatures in the binaries of calls to programs, services or functions of the legacy computing environment by the monolithic legacy application, such as a suite of assembler instructions. The load module compiler may use this information to determine the legacy emulator functions used by the microservice or set of microservices. The container builder (375) may then locate emulator elements able to perform these functions among the emulator elements in the complementary component repository (380) and place the emulator elements, along with any associated OS elements from the complementary component repository (380) with the microservice images or set of microservice images into a container image. Alternatively, the container builder (375) will place the images of the emulator elements and OS elements in a container image associated with a container image of the microservices image or set of images, such that both container images will be placed in a pod.

In addition, the load module compiler may replace the signature or signatures in the binaries with instructions to call the same function or functions called in the legacy computing environment in the legacy emulator instead, thereby forming a legacy emulator-optimized microservice image that may be stored in the container image. Signatures may be identified and replacement instructions located using a pre-existing database created for the monolithic legacy application or legacy computing environment and the legacy emulator or the distinct computing environment of the scalable container-based system. In addition, the container builder (375) may replace the identified legacy function calls with calls to native APIs of the legacy emulator and construct a modified image or images.

During or after any optimization or modifications of microservice images or container images as described herein, the container builder (375) then stores in the container image repository (390). Subsequently the container images in the container image repository (390) are executed in containers (395) managed by the container management system (385).

In accordance with certain embodiments, the container image repository (390) may be a Docker repository, similar in structure to the public Docker Hub. The container management system (385) then preferably supports Docker containers and enables their optimized execution.

Container management system (385) may combine the functions of scheduling the instantiation of containers, running containers, allocating them a controlled amount of computing/storage/networking resources, upgrading them, and/or may perform additional logging and management functions to track and manage the health of the system. In accordance with certain embodiments, the container management system (385) may be the Kubernetes container management system for Docker containers. But other container management system such as the Amazon ACS, Azure Container Service, Cloud Foundry Diego, CoreOS Fleet, Docker Swarm, Google Container Engine, or Mesosphere Marathon container management system, or other container orchestration systems could be used. The container management system (385), may be similar to that described in FIG. 1B, with modifications and additions as described herein. The selective allocation of resources by container management system (385) may be done by the use of cgroups when the containers are based on Docker, An intelligent proxy (not shown) in front of the container management system (385) can maintain a permanent TCP connection with the terminal emulator of the end user or any other client interface requiring permanent connection. This proxy will then scan the requests on the permanent connection and convert them to the appropriate service requests that are then routed by Kubernetes toward the appropriate microservice. The ad hoc wrappers in intelligent proxy and in microservices allow the encapsulation of 3270 traffic or any other specific traffic into microservices requests and responses.

Containers (395) and container management system (385) may reside in sub-system (400). Sub-system (400) may be physically separate from the rest of scalable container-based system (300) and may operate at a stand-alone system that is able to achieve the same benefits available when using scalable container-based system (300). For instance, sub-system (400) may perform resource allocation and container management functions as described herein. Particularly if sub-system (400) also includes container image repository (390), container management system (385) may also create additional or duplicate containers using container images.

Sub-system (400) may still benefit from the partitioning of the monolithic legacy application into microservices and from the inclusion of only needed emulator elements and OS elements in container images. However, because sub-system (400) lacks the elements of scalable container-based system (300) devoted to creating microservice definition vectors and container images, it is not able to automatically update its container images and containers. Instead, it may receive updated container images that container management system (385) applies to containers (395), or that are stored in container image repository (390), if present.

Another sub-system, not illustrated, may include containers (395), container management system (385), container image repository (390), container builder (375), and complementary component repository (380). Such a sub-system may be be physically separate from the rest of scalable container-based system (300) and may achieve many of the benefits described in connection with system (300). Such as sub-system has the ability to update container images when provided with new microservice images. Such a sub-system may further contain microservice image repository (355) and/or (legacy application emulator (325), but lack components responsible for developing new microservice definition vectors and/or microservice images initially or when the monolithic source code is updated. Such a sub-system may also include a legacy application emulator (325).

Many legacy applications based on relational databases are structured according to Tedd Codd's relational theory initially published in his article "A Relational Model of Data for Large Shared Data Banks" CACM 13, No. 6, June 1970. Those legacy databases have been designed with minimal redundancy in mind: their structure has usually been normalized as far as possible. Fifth Normal Form (5NF) was the initial design goal for most of them, even if real life has altered this ideal form over the years. The result of a high degree of normalization is high interdependencies across various sections of the data used by a monolithic legacy application.

This entangled data architecture creates indirect interdependencies across clusters of programs in the monolithic legacy application that share the same data either directly (sql requests accessing same tables) or indirectly (tables accessing by program X modified by constraints of referential integrity on tables updated by program Y)

But, in most cases, a typical large monolithic legacy application still has clusters of independent data in its large database composed of thousands of tables. In a scalable container-based system, these clusters should, to improve various system capabilities, be separated into independent sub-databases, each used by an independent set of microservices. These sub-databases can then be isolated, for example in separate database servers and can be managed independently from each other. This increases flexibility and agility of the system overall because local data structure changes are simpler to execute from an operational standpoint than global ones. This separation of databases into sub-databases also increases global availability of the scalable container-based system because a problem with one sub-database or its maintenance does not impact the other databases and microservices that use them.

Similar to identifying program dependencies, data may be partitioned according to the microservice architecture by creating dependency trees that identify data clusters through their use in corresponding transactions or sets of transactions. This identification may be done by the source code analyzer (320), and particularly its dependency analyzer, as it parses the monolithic legacy application to produce sub-databases and sub-database clusters, typically in the form of vectors or tables, that can be separated from each other to achieve at least some of the benefits described above.

Various microservices images may share similar access to same sub-databases. In particular, relational database service transactions may be separately packaged from transactions for other functionalities of the legacy emulator, so that for example, processing services and database services are ultimately defined in separate microservices.

Full database or sub-databases may be shared across several microservices. The full database or sub-databases maybe located in separate long-lasting database containers, that are remotely access by shorter-lived processing container. Typically, containers with processing microservices may be in a pod with one or more containers housing the relational database services and sub-databases used by the processing microservices.

In similar types of structures, support for objects shared across transactions in the monolithic legacy application may be implemented by detecting the shared objects using the source code analyzer and then gathering support objects in specialized resource containers using the container builder as informed by the source code analyzer. For example, CICS TS queues shared among programs present in several microservices may reside in a long-lived resource container hosting them. These shared objects (e.g. memory sessions, message queues, shared data objects) may be remotely but transparently accessed through the legacy emulator's remote access functions, initially developed for the purpose of replicating remote access functions of the legacy computing environment. In the case of CICS legacy environment, those functions are the emulated versions of legacy functions like MRO, IPIC, etc. Shared memory zones (CSA, CICS CWA, CICS TCTUA, etc. in case of a z/OS system) can be detected, placed in a distributed share cache and remotely accessed by the same remote access functions on the specific resource containers when shared across various microservices.

In another similar type of structure, in order to maximize data separation, transactions may be constructed that span across several microservices calling each other synchronously in cascade after the initial service request to Kubernetes. This embodiment introduces the additional complexity of database connection sharing and distributed transaction with related issues of distributed 2-phase commit.

The container-based system described herein presents a changed landscape from a build standpoint by providing an adaptive, integrated build process that is flexibly coupled to the production environment. When modifications to the source code stored in source code repository (305) are made, compiled by compiler (310), and stored in binary repository (315), the source code analyzer (320), transaction state definition repository (340), microservice definition optimizer (345), and microservice image builder (350) can be used to construct an updated microservice image or set of microservice images for the microservice or microservices corresponding to only those transactions impacted by the changes. The container builder (375) can then trigger construct procedures, automatically and optimally defined and setup based on microservices definition vectors previously extracted by the container builder, container images for the updated microservices, which can then be deployed by the container management system (385). The container images may simply include updated images for a microservice or set of microservices, but they may also include changes, if needed, to images from the complementary component repository (380). In the case of more extreme or multiple changes to the source code, the microservice definition vectors may be changed, so that a different microservice or set of microservices is created. For instance, if the source code is changed to provide a large number of transactions that use a common set of programs, then that common set of programs may be newly placed in a separate microservice, similar to MS3 in FIG. 5, and existing and new microservice definition vectors for other microservices are modified or created accordingly.

The entire update process is preferably automated, but deployment of updated microservices may also be placed under control of an administrative management console (not shown). Similarly, where there are changes to other information, such as data (e.g. copybooks, sql files, etc), dependencies on the change may be identified and propagated to automatically adapt build procedures.

To illustrate, automatic steps of the update process may include: (1) source code structure placed into the source code repository (310); (2) Jenkins (or other DevOps build system) build job definition; (3) Docker image construction through proper clustering of mainframe binaries; and (4) Kubernetes management parameters.

The microservices structure of the scalable container-based system also provides advantages in terms of the number of changed needed to update and the time consumed in doing so. For instances, as illustrated in FIG. 5, changes to program D or E need only be made in the build of the microservice MS3, rather than in two separate microservice builds, MS1 and MS2, for transactions T1 and T2. The high level of granularity presented by a large number of independent microservices permits, and preferably operates under full automation.

The formation of such microservices can improve overall system manageability, since upgrades or changes to the application code that change the subtree need only cause upgrades to the corresponding containers for the internal microservice, and not for all microservices that invoke it.

Given the ease with which containers may be constructed and the reduced time for loading a container image into a container if it is smaller, the microservice definition optimizer (345) in many scalable container-based systems may implement instructions to create multiple microservice definition vectors per transaction definition vector, particularly where, as illustrated in FIG. 4 and FIG. 5, transactions use common programs or sets of programs that are amenable to being placed in a separate microservice. For example, T transactions can easily become P microservices, where P is the number of programs, and T was the number of entry points for transactions supported by the monolithic legacy application, if the need for entry points is no longer the root program of each existing transaction but any callable (via LINK for example under CICS) program within the application.

Whether a given scalable container-based system will be implemented using pods or only containers may further inform how microservices are created and defined. For instance, greater parsing of transactions into microservices and more minimal microservice definition vectors may be possible in a scalable container-based system designed to use pods than in one not so designed.

In some instances, the only limits on the number of separate microservices defined may be the number of separate programs in the monolithic legacy application and/or memory available in the scalable container-based system for housing microservice image repository (355) and/or containers (395).

In addition, because a given container image may be placed in any number of active containers, the scalable container-based system allows checking and gradual implementation of updates, with some containers running old versions of a microservice or set of microservices, with newer containers running the updated microservice or set of microservices. This allows updates to be checked and tested for failures, while maintaining the ability to perform a transaction using an old version of the microservice or set of microservices if need be. Containers running old version of microservices can be automatically torn down (or removed based on a user instruction) once the update has been sufficiently verified.

In addition, because containers can be built and torn down easily, if a transaction is running in some containers, new containers with updates can be built to perform new requests for that transaction, while it finishes in existing containers lacking the update, when can then be automatically torn down when they complete the transaction they are immediately running. Thus, for example, if ten containers C1-C10 are running transaction T1, when an update to corresponding MS1 occurs, container management system (385) may automatically create a new container, C11, when a new request for the transaction is received. Container C11 includes an image of the updated microservice, MS1'. When container C1 completes the transaction it is running, no new transactions are assigned to container C1 and it is torn down. A new container with the updated microservice MS1' may be immediately build to replace C1, or it may be build when a new request for transaction T1 comes in, depending on the parameters applied by the container management system (385) for creating and managing containers.

Technologies like Docker and Kubernetes have been designed to work at web scale and consequently, to allow very quick growth of workloads that can be spread on more and more added x86 machines as more requests arrive. That is exactly the purpose of an orchestrator like Kubernetes. As online customer transactions increasingly require answering greater and greater numbers of queries before completing a transaction, the demands of online commerce introduce scalability problems into the expansion of legacy computing environments into the online marketplace. The scalability of a container-based system such as is described herein is particularly advantageous in increasing the scalability of such legacy computing environments, by enabling the proliferation of containers dedicated to these consumer-intensive query applications. Furthermore, because each container image, or in some instances each pod, contains some OS elements and some emulator elements, it can easily be duplicated or moved from piece of hardware to another, so long as the distinct computing environment, such as use of a Linux operating system, is preserved.

The isolation provided by isolated containers also provides for a much more sophisticated approach in service level management. Each container can be allocated different quantity of resources to better serve some microservices (corresponding to or used by specific legacy transactions) than other. A scalable container-based system as described herein can automatically detect and track resource usage by container and devote more or fewer resources based on usage. In addition or alternatively, the container management system may scale the number of containers devoted to a particular microservice or set of microservices based on usage. User defined priorities may also be included in the calculations for resource allocation or number of containers corresponding to a transaction or microservice. This user-defined adjustment of resources available to a given transaction is not possible in the monolithic legacy application.

In some variations, the initial deployment of container images containing microservices or sets of microservices into container or pods may be based, at least in part, on transaction activity when the monolithic legacy application is executed in a legacy computing environment, or an emulation thereof. Such information may be derived from a legacy emulator, such as legacy emulator (325) as illustrated in FIG. 3. Such information may also be derived from legacy activity logs, such as legacy activity logs (360) or an activity log analyzer, such as activity log analyzer (365) (not illustrated in FIG. 3).

For instance, the resource consumption for a given transaction when using a monolithic legacy application is often precisely monitored. The resource numbers may be extracted and can be used, after transposition to similar resource numbers in the distinct computing environment of the scalable container-based system, as a basis for the deployment definition parameters of the scalable container-based system, particularly the container management system (385).

Furthermore, by running security and individual APIs or transaction service support features in discrete containers, the scalable container-based system increases security by limiting the access to protected data and resources on as-needed basis. Additionally, the security features of the initial legacy application are ported into the set of available microservices and may be specifically identified and included with microservices by the microservice definition optimizer (345).

Figure 1B:
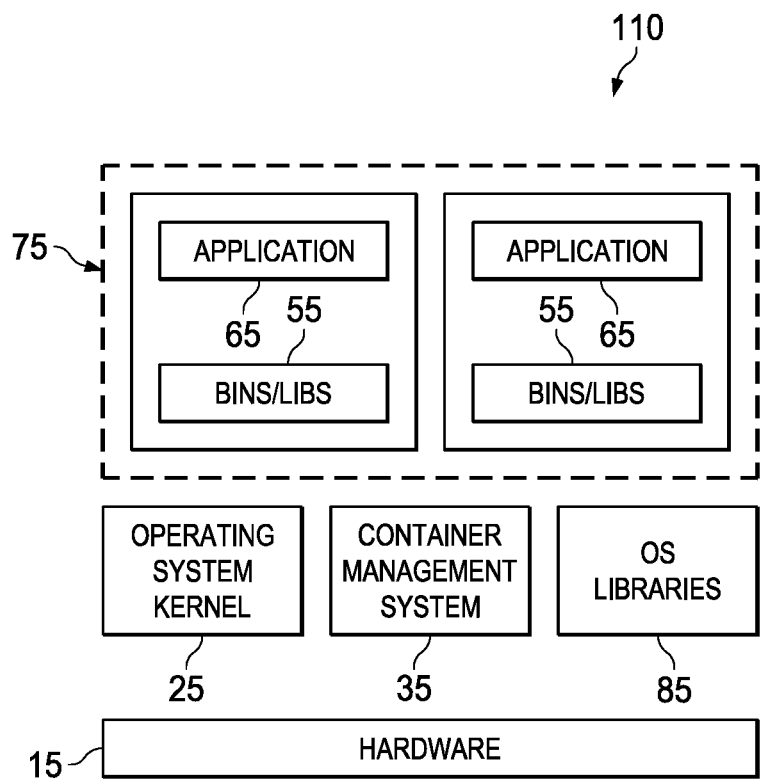
FIG. 1B is a schematic diagram of a container-based virtualized environment that may be modified and used in conjunction with the present invention.

The containers in a scalable container-based system, such as that of general type depicted in FIG. 1B may operate without a hypervisor, allowing the scalable container-based system to operate more efficiently than a system, such as a virtual machine such as the type depicted in FIG. 1A, in which additional components, such as a hypervisor or multiple OS copies, must also operate.

A system, in accordance with the description above, may be implemented in computer instructions stored in a non-transitory medium, such as a computer storage medium in a server or server cluster, or set of server clusters. The computer instructions may be stored on a non-volatile fixed or removable storage medium for installation on such a system. In one embodiment, the source code repository (310), transaction state definition repository (340), and dynamic definition repository (440) are stored in a common repository system, while the binary repository (330), transaction image repository (360), complementary component repository (450), and the container image repository (370) are stored on a common binary image repository system. In another embodiment, the container image repository (370) is instantiated in a separate platform. Depending on the scale and needs of the system, different numbers of repository systems may be used, and the source and binary repositories may be shared or separated into distinct repository systems.

Instructions and/or data may be stored in an otherwise typical manner. For example, binary images can be stored on disk in the usual hierarchical structure of a standard file system. Application data can be stored either in regular files and/or in a structured (relational, hierarchical, etc.) database.

Figure 6:
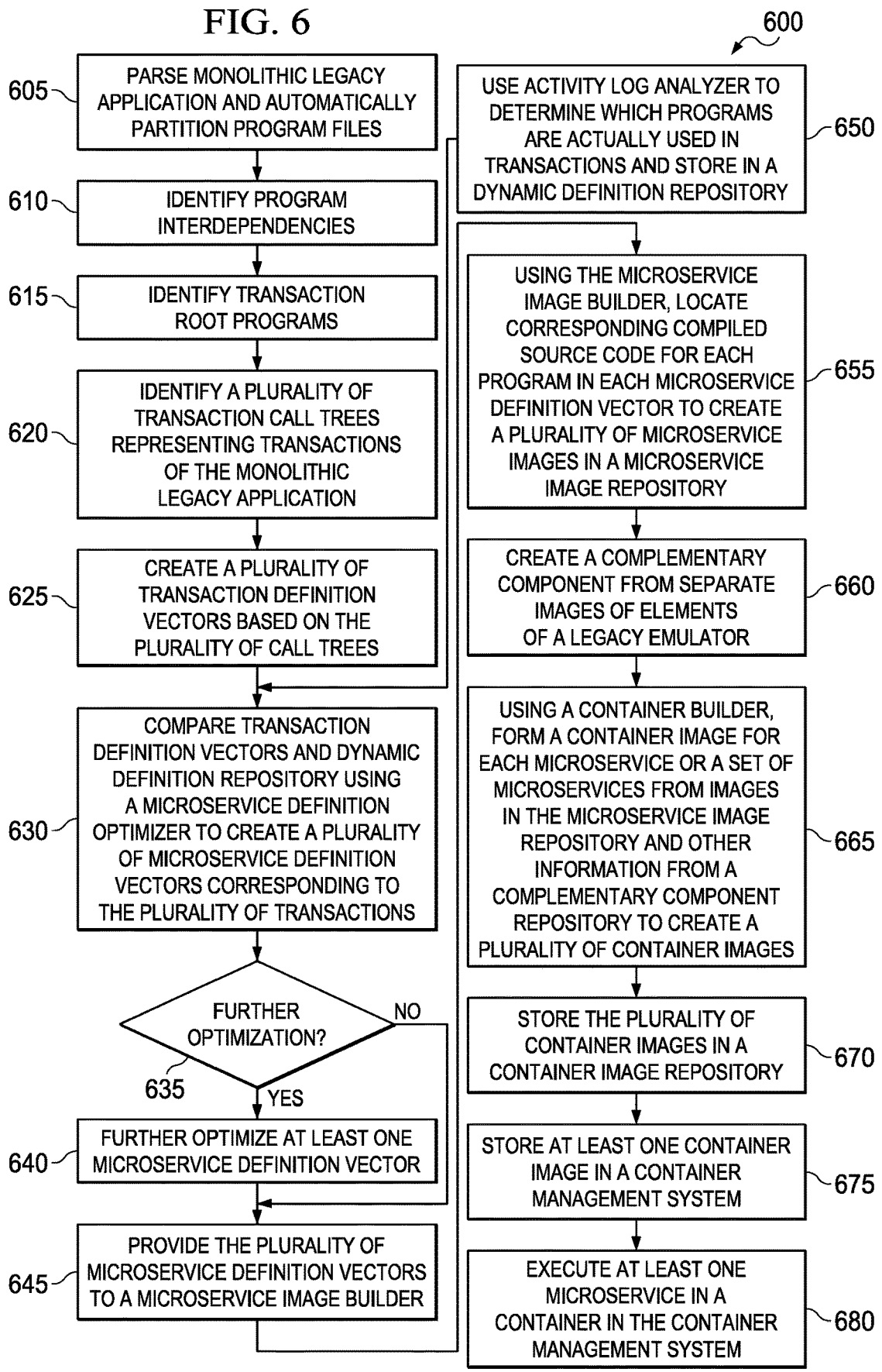
FIG. 6 is a flow chart depicting the steps of a method for parsing a monolithic legacy application to deploy microservices in a scalable container-based environment.

In accordance with another aspect of the invention, a method for producing and/or maintaining a scalable container-based system that performs the operations of a monolithic legacy application is provided. FIG. 6 is flow chart of certain steps of such as method. However, any functions described above in connection with the scalable container-based system may also be included in the method. In addition, although the method is not limited to use with any particular system, it may be implemented on the scalable container-based system described above.

Method 600 includes step 605, in which a monolithic legacy application is parsed and program files are automatically partitioned. In step 610, transaction root programs are identified. In step, 615, which may occur before or after step 610, program interdependencies are identified. Steps 610 and 615 may occur simultaneously for different transactions in a plurality of transactions.

Next, in step 620, a plurality of transaction call trees is identified. Preferably, this plurality of transaction call trees represents all transactions possible in the monolithic legacy application or all transactions possible in a defined subpart of the monolithic legacy application.

In step 625, the plurality of transaction call trees is used to create a plurality of transaction definition vectors that are stored, for example in a transaction state definition repository.

In step 650, an activity log analyzer determines which programs are actually used in all transactions possible in the monolithic legacy application, or in all transactions possible in a defined subpart of the monolithic legacy application. If only a defined subpart of the monolithic legacy application is used, it will typically be the same as, include the entirety of, or overlap at least partially with the subpart of step 625. The activity log analyzer may use legacy activity logs of the monolithic legacy application as run in its original environment to determine which programs are actually used in transactions. The activity log analyzer may alternatively use an emulator to run the monolithic legacy application in order to determine which programs are actually used in transactions. In some methods, the same or different activity log analyzers may use both legacy activity logs and an emulator to determine which programs are actually used in transactions. Based on the results, a dynamic definition repository is created. The dynamic definition repository contains a log of programs used for each transaction in a plurality of transactions. In some embodiments, this log may include a plurality of dynamic definition vectors. The dynamic definition repository may be defined with respect to the transaction state definition repository, or it may be created independently.

In step 630, the plurality of transaction definition vectors from step 625 are compared to the dynamic definition repository from step 650 by a microservice definition optimizer and programs not actually used in a transaction are removed from each transaction definition vector to create a plurality of microservice definition vectors corresponding to the plurality of transactions.

In step 635, the microservice definition optimizer determines if further optimization will occur. If further optimization will occur, then in step 640, at least one of the plurality of the microservice definition vector is further optimized, then in step 645 it is provided to a microservice image builder. If further optimization will not occur for any of the plurality of microservice definition vectors, then in step 645, the microservice definition vector is provided to a microservice image builder. Regardless of whether optimization occurs for any of the microservice definition vectors, the plurality of microservice definition vectors derived from the plurality of transaction vectors is provided to the microservice image builder in step 645.

In step 655, the microservice image builder takes each microservice definition vector of the plurality of microservice definition vectors and locates corresponding compiled source code compiled to run in the legacy computing environment from a binary repository to form a microservice image in a microservice image repository. The microservice image may also contain further information and artifacts used by the programs it contains. After step 655 is completed, the microservice image repository preferably contains plurality of microservice images corresponding to each of a plurality of transactions possible in the monolithic legacy application or a defined subpart thereof.

In step 660, a complementary component repository is created from separate images of elements of a legacy emulator. The separate elements correspond to different functions of the legacy emulator. Images of OS elements associated with the legacy emulator may also be stored in the complementary component repository.

In step 665, a container builder forms a container image for each microservice or a set of microservices using image(s) from the microservice image repository along with images from the complementary component repository of emulator elements of the legacy emulator used to execute the microservice or microservices. Other images from the complementary component repository, such as images of OS elements associated with the elements of the legacy emulator may also be placed in the container image. Emulator elements may be selected by identifying signatures of calls to functions or programs in the binaries of the microservice image and including emulator elements able to perform the called functions or operate with the called programs. In certain embodiments, at least one binary in at least one microservice image in each container image may be altered to form a legacy emulator optimized microservice image, in which the signature of a call in the microservice binary image is replaced with instructions to call the same function or functions in the legacy emulator.

In step 670, the plurality of container images is stored in a container image repository.

In step 675, at least one container image in the container image repository is stored in a container by a container management system. Information from an activity log analyzer, as well as the microservice images themselves may be used by the container management system. Preferably, each container image is activated in at least one container. Each container image may be assigned a resource allocation that is reflected in resources allocated to the container or containers in which it is contained.

In step 680, at least one microservice is executed in a container in the container management system.

Many examples are provided herein. These examples may be modified without departing from the spirit of the present invention. For instance, any of the various examples and embodiments may be combined with one another unless they are clearly mutually exclusive. The examples and embodiments described herein are offered as examples, and other components, routines, or modules may also be used.

The invention claimed is:

1. A scalable container-based system implemented in computer instructions stored in a non-transitory medium, the system comprising:
   a microservice image, derived from a transaction of a legacy application executable in a legacy computing environment, comprising optimized program vectors corresponding to the transaction, wherein the optimized program vectors are optimized by excluding programs that are unused during the transaction;
   a container builder operable to form container images comprising:
      the microservice image;
      a first image corresponding to optimized components of a legacy emulator for execution in a distinct computing environment, wherein the container builder identifies emulator elements of the legacy emulator corresponding to functions using signatures of calls in the microservice image to create the container images and replaces the signatures in binaries with instructions for calls operable in the legacy emulator; and
      a second image corresponding to optimized operating system (OS) elements used by the legacy emulator, wherein the optimized OS elements are required for execution of the transaction; and
   a container management system operable to:
      create a number of containers for execution of the container images;
      execute the transaction in at least one container of the number of containers;
      determine the number of containers based on information from an activity log analyzer; and
      determine resources to allocate to separate container using information from the activity loci analyzer,
      wherein, when source code is changed, the scalable container-based system is operable to automatically update the microservice image, at least one container image, and at least one container to contain an updated binary based on the source code change.

2. The scalable container-based system of claim 1, wherein the microservice image comprises security features.

3. The scalable container-based system of claim 2, wherein the security features are identified to include optimized security features derived from the transaction of the legacy application.

4. The scalable container-based system of claim 3, wherein the container builder selects the first image or second image, or both, to provide functionalities associated with the microservice image.

5. The scalable container-based system of claim 4, wherein the optimized security features are placed in containers separate from containers having the first image or second image, or both.

6. The scalable container-based system of claim 1, wherein the second image corresponding to the optimized OS elements comprises a portion of the operating system.

7. The scalable container-based system of claim 1, wherein the second image corresponding to the optimized OS elements is not the entire operating system.

8. The scalable container-based system of claim 1, wherein the optimized OS elements are binary images of functional components.

9. The scalable container-based system of claim 1, wherein each container image is activated in at least one container.

10. The scalable container-based system of claim 1, comprising a plurality of microservice images, wherein one of the optimized program vectors is located in the plurality of microservice images.

11. The scalable container-based system of claim 10, wherein one of the optimized program vectors is located in one microservice image.

12. The scalable container-based system of claim 1, wherein containers form a pod.

13. The scalable container-based system of claim 1, wherein the microservice image includes the smallest number of programs needed to perform the transaction.

14. The scalable container-based system of claim 1, wherein the activity log analyzer uses legacy activity logs of the legacy application generated by running the legacy application in the legacy computing environment.

15. The scalable container-based system of claim 1, wherein the activity log analyzer uses an emulator to run the monolithic legacy application to generate log files and to determine which programs are used by the legacy application during the execution of transactions.

16. The scalable container-based system of claim 1, wherein the legacy computing environment comprises a Multiple Virtual Storage (MVS) or z/OS computer system.

17. The scalable container-based system of claim 1, wherein a set of complementary images are instantiated in a separate container within a common pod.

18. The scalable container-based system of claim 1, wherein more than one copy of one container image is activated in more than one separate containers.

19. The scalable container-based system of claim 1, wherein the container management system is operable to allocate varying resources to separate containers.

20. A method of creating and operating a scalable container-based system, the method comprising:
obtaining a microservice image, derived from a transaction of a legacy application executable in a legacy computing environment, comprising optimized program vectors corresponding to the transaction, wherein the optimized program vectors are optimized by excluding programs that are unused during the transaction;
constructing container images using a container builder, wherein the container images comprise:
the microservice image;
optimized components of a legacy emulator required for execution of the transaction in a distinct computing environment, wherein emulator elements of the legacy emulator corresponding to functions using call signatures present in the microservice image are identified and at least one call signature in the binaries of the microservice image is replaced with instructions for calls operable in the legacy emulator; and
optimized operating system (OS) elements used by the legacy emulator, wherein the optimized OS elements are required for execution of the transaction;
creating a number of containers in the distinct computing environment using a container management system;
storing, via the container management system, at least one container image in at least one container of the number of containers;
executing, via the container management system, the transaction in the at least one container;
determining, via the container management system, the number of containers needed and resources to allocate separate containers based on information from an activity log analyzer;
scaling, via the container management system, the number of containers based on the determined number of containers needed; and
automatically updating the microservice image, at least one container image, and at least on container to contain an updated binary based on a change in source code.

21. The method of claim 20, wherein the activity log analyzer generates activity log data using logs of the legacy application running in the legacy computing environment.

22. The method of claim 20, wherein the activity log analyzer generates activity log data using logs of said legacy application running in emulation.

23. The method of claim 20, comprising generating a WSDL message interface and providing the WSDL message interface to the container management system.

24. The method of claim 20, comprising instantiating a set of complementary images in separate containers within a common pod.

25. The method of claim 20, wherein one of the containers contains a legacy database application.

26. The method of claim 20, wherein the same container image for executing a legacy transaction is inserted in multiple containers by the container management system.

27. The method of claim 20, wherein a first version of a container image is inserted in a container by the container management system, and an updated container image is inserted in another container by the container management system.

28. The method claim 20, comprising replacing at least one of said signatures with calls to a native API of the legacy emulator.

* * * * *

UNITED STATES PATENT AND TRADEMARK OFFICE
CERTIFICATE OF CORRECTION

| | | |
|---|---|---|
| PATENT NO. | : 11,762,639 B2 | Page 1 of 1 |
| APPLICATION NO. | : 17/879693 | |
| DATED | : September 19, 2023 | |
| INVENTOR(S) | : Jan Jaeger et al. | |

It is certified that error appears in the above-identified patent and that said Letters Patent is hereby corrected as shown below:

In the Claims

Column 26, Claim 1, Line 26:
"activity loci analyzer," should read: --activity log analyzer,--.

Signed and Sealed this
First Day of July, 2025

Coke Morgan Stewart
*Acting Director of the United States Patent and Trademark Office*